United States Patent

Unterforsthuber et al.

Patent Number: 5,149,129
Date of Patent: Sep. 22, 1992

[54] GAS GENERATOR

[75] Inventors: Karl Unterforsthuber, Oberhaching; Christian Geisreiter, Munich, both of Fed. Rep. of Germany

[73] Assignee: Bayern-Chemie Gesselschaft für Flugchemische Antriebe mbH, Fed. Rep. of Germany

[21] Appl. No.: 660,704

[22] Filed: Feb. 22, 1991

[30] Foreign Application Priority Data

Feb. 24, 1990 [DE] Fed. Rep. of Germany ....... 4005871

[51] Int. Cl.⁵ ............................................. B60R 21/16
[52] U.S. Cl. ................................... 280/740; 422/165; 422/166; 422/305; 280/741; 280/736; 280/742
[58] Field of Search ......................... 422/165, 166, 305; 280/741, 740, 736, 742; 102/530, 531

[56] References Cited

U.S. PATENT DOCUMENTS 4,278,638  7/1981  Nilsson et al. ............... 422/166
4,547,342 10/1985  Adams et al. ............... 422/166

Primary Examiner—Robert J. Warden
Assistant Examiner—Laura E. Collins
Attorney, Agent, or Firm—McGlew & Tuttle

[57] ABSTRACT

A gas generator for an air bag has a combustion chamber (6), which is surrounded by an annular filter chamber (11), wherein the annular filter (14) of the filter chamber (11) has an exposed annular surface extending on its outside over its entire circumference for discharging the propellant gases into the air bag (24).

16 Claims, 2 Drawing Sheets

GAS GENERATOR

FIELD OF THE INVENTION

The present pertains to a gas generator for an inflatable protective cushion (air bag) of a collision protection system for occupants in a vehicle including a combustion chamber which is filled with a solid propellent that can be ignited by an igniting unit and a filter chamber with a filter ring, the filter chamber being positioned adjacent the combustion chamber and communicating with the combustion chamber through passage openings, the propellent gas flowing through the filter chamber being discharged into an air bag.

BACKGROUND OF THE INVENTION

In prior-art air bag gas generators, the filter ring is surrounded by a filter chamber housing. The filter chamber housing is provided with punched-out or drilled discharge openings or discharge openings arranged in any other way. Through these openings the propellant gas flows into the air bag (cf., e.g., West German Offenlegungsschrift No. DE-OS 25,38,386, corresponding to U.S. Pat. No. 4,278,638 of Jul. 14, 1981, West German Offenlegungsschrift No. DE-OS 29,15,202, West German Offenlegungsschrift No. DE-OS 37,42,383, and EP 0,012.627 B1).

In the gas generator according to U.S. Pat. No. 4,278,638 (West German Offenlegungsschrift No. DE-OS 29,15,202), the gas generator is made of sheet metal and is provided with a toroidal combustion chamber, which surrounds a central pipe with an igniting unit. To achieve this, the combustion chamber housing is composed of the inner section of an annular housing shell, with S-shaped cross section, and a cover. The inner edge of the housing shell is connected to the central pipe, and the inner edge of the cover is also connected to the central pipe, and its outer edge is connected to the housing shell. A cover plate is provided with an outer circumference designed as a flange for fastening the generator on the vehicle. This cover plate delimits, together with the outer section of the housing shell, the filter chamber to the outside. Discharge openings, through which the propellant gas flows into the air bag, are punched in the outer section of the housing shell.

The high noise level during the burning off of the propellant is especially disadvantageous in the prior-art gas generators. In addition, it is desirable to reduce the manufacturing costs, the intrinsic weight of the gas generator, and the load of the filter ring, with increased effectiveness of the filter ring.

SUMMARY AND OBJECT OF THE INVENTION

It is an object of the present invention to provide a gas generator of reduced weight, which can be mass-produced at low cost and in which the noise level during the burning off of the propellant is substantially reduced and the load of the filter ring is reduced while its effectiveness is increased.

This is accomplished according to the present invention with a gas generator provided with a filter ring which has on its outside an exposed annular surface extending over its entire cross section. The outer annular surface of the filter ring is held in position at its interior edges such that no structure is provided between the filter ring exposed annular surface and the air bag.

According to the invention, a combustion chamber is provided delimited by a toroidal housing which surrounds a central pipe. The central pipe includes an igniting unit. The housing has a radially outwardly extending wall which delimits a filter chamber in cooperation with a filter ring positioned to the outside of the radially outwardly extending wall. The filter ring joins at least one of the two axial ends of the combustion chamber housing such that the filter ring has the above mentioned exposed annular surface, directly facing the interior of the air bag. The combustion chamber housing is preferably formed by the inner section of an annular housing shell with s-shaped cross section, whose inner edge is connected to the central pipe and by a cover whose inner edge is connected to the central pipe and whose outer edge is connected to the housing shell. The outer section of the s-shaped housing shell extends beyond the combustion chamber and delimits the filter chamber together with the filter ring.

Consequently, the outer delimitation for supporting the filter ring, which has consistently been considered to be absolutely necessary according to the state of the art, is omitted in the gas generator according to the present invention, so that a fully exposed, closed annular surface extending around the entire circumference of the outside of the filter ring is formed.

In other words, there is a single, large opening, namely, the aforementioned closed annular surface, for discharging the propellant gas from the filter chamber into the air bag, in the gas generator according to the present invention.

This leads to a considerable reduction of the noise level during the burning off of the propellant. At the same time, the cost of manufacture is reduced substantially, because it is unnecessary to punch or otherwise provide discharge openings in the filter chamber wall. Due to the elimination of a filter chamber wall section with discharge openings, the weight of the gas generator is reduced as well. The same filter surface that is covered by the outer delimitation, which hitherto has been considered to be necessary in conventional gas generators, is additionally available in the gas generator according to the present invention, as a result of which the effective active surface of the filter rings is markedly enlarged, which reduces its mechanical and thermal load caused by the gas-slag mixture as a whole.

In the gas generator according to the present invention, the filter ring is designed, in terms of strength, such that it will reliably withstand the radial load during the burning off of the propellant. If the filter ring consists of a ring formed by a multilayered wire mesh, the abutting ends are, e.g., welded together. However, the filter ring may also be produced in another way, e.g., as a sintered body or from a tubular fabric material that may be folded back several times.

The gas generator according to the present invention can be used for the air bag on the driver's side as well as for the air bag on the passenger side, i.e., the gas generator according to the present invention can be designed especially in a tubular form and comprise at least one combustion chamber and at least one filter chamber.

A further object of the invention is to provide an air bag gas generator arrangement which is simple in design, rugged in construction and economical to manufacture.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
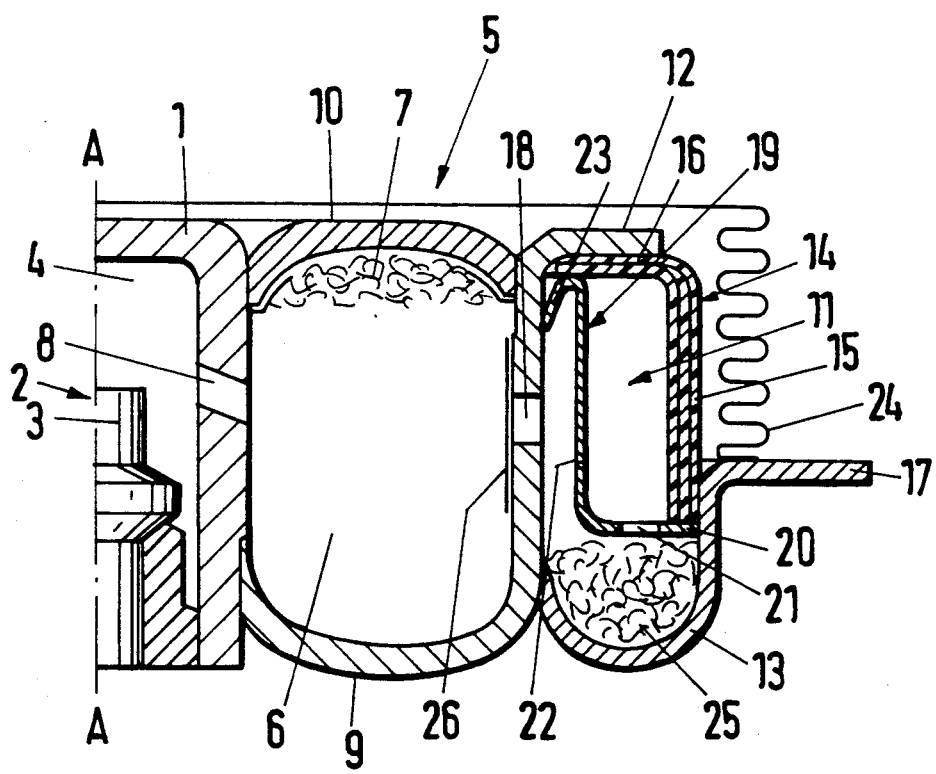
FIG. 1 is a cross sectional view of first embodiment according to the invention.

According to the embodiment shown in FIG. 1, the gas generator has a central pipe 1 closed toward its top for accommodating an igniting unit 2, which closes the central pipe 1 in the downward direction. The igniting unit 2 has an igniting pellet 3 and an igniting mixture 4.

A toroidal housing 5, which surrounds the combustion chamber 6 filled with lumpy, e.g., pelletized solid propellant (not shown), extends around the central pipe 1, rotationally symmetrically to the central axis A—A. To equalize the volume, a volume-equalizing material 7, e.g., a wire mesh netting, is provided on the propellant. The igniting device 2 communicates with the combustion chamber 6 through igniting openings 8.

The combustion chamber housing 5 consists, according to the embodiment of FIG. 1, of an annular shell 9 of S-shaped cross section, whose inner edge is connected to the central pipe 1 in a pressure-tight manner, e.g., by welding. The housing 5 also includes a cover 10, whose inner edge is connected to the central pipe 1 and whose outer edge is connected to the housing shell 9 in a pressure-tight manner, e.g., by welding. The cover 10 lies on the volume-equalizing material 7.

The combustion chamber 6 is surrounded by a filter chamber 11. The filter chamber 11 is delimited by a wall section 12 of the housing shell extended beyond the combustion chamber 6 and by an annular cover plate 13 of U-shaped cross section. The cover plate 13 is fastened, at its inner edge, to the lower axial end of the combustion chamber housing 5, e.g., by welding, and forms a wall extending radially to the outside from the lower axial end of the combustion chamber housing 5. The area of the filter chamber 11, through which the gas flows into the downstream air bag 24, is delimited by a filter ring 14 with L-shaped or angular cross section, whose vertex (corner of filter ring 14) faces away from the combustion chamber 6. One leg of the angle forms a wall section 15 that is essentially cylindrical relative to the central axis A—A, and the other leg forms a radially extending wall section 16. The filter ring 14 may consist, e.g., of a multilayered, e.g., three-layered fabric ring.

The radially extending external section of the U-shaped cover plate 13, which is curved in the axial direction, extends over the lower edge of the cylindrical wall section 15 of the filter ring 14, and the axially extended wall section 12 of the housing shell 9 extends over the radially extending wall section 16 of the filter ring 14.

A mounting flange 17, with which the gas generator is fastened on the vehicle, extends radially to the outside from the radially outer end of the U-shaped cover plate 13, with which it is made in one piece.

The filter chamber 11 communicates with the combustion chamber 6 through passage openings 18 in the housing shell 9. Through these openings 18 the propellant gas flows from the combustion chamber 6 into the filter chamber 11.

An annular baffle plate 19 with L-shaped or angular cross section, whose vertex (corner of baffle plate 19) faces the combustion chamber 6, is arranged in the filter chamber 11. The radially extending wall section 20 of the baffle plate 19 is provided with passage openings 21. The cylindrical wall section 22 of the baffle plate 19 is arranged in front of, i.e., opposite the passage openings 18. At its end facing away from the vertex, the cylindrical wall section 22 is provided with a strap-shaped, section 23, which is in firm contact with the housing shell 9 and presses the radially extending section 16 of the filter ring 14 against the wall section 12.

Thus, the propellant gas being discharged from the passage openings 18 strikes the cylindrical wall section of the baffle plate 19, as a result of which it is deflected toward the passage openings 21, from which the propellant gases flow to the filter ring 14, through the fully exposed, cylindrical circumferential wall 15 of which they are able to be discharged into the air bag 24, which covers the gas generator at the top in its folded state.

At the same time, the filter ring 14 is securely fixed due to the U-shaped cover plate 13 extending over the lower circumferential edge of the cylindrical section 15 and due to the radially extending section 16 being pressed by the strap-shaped section 23 of the baffle plate 19 against the wall section 12 of the filter ring 14.

A pre-filter 25 is arranged in the filter chamber 11 under the radially extending section 20 of the baffle plate 19, i.e., in front of the passage openings 21 in the direction of flow of the propellant gas.

On their side facing the combustion chamber 6, the passage openings 18 in the housing shell 9 are closed with a film 26, which protects the propellant charge in the combustion chamber 6 from ambient effects and by which a pressure threshold is first built up during the burning off of the propellant before it bursts.

In this embodiment, the film 26 cannot be arranged outside over the passage openings 18, because it would be damaged by the strap-shaped section 23 during assembly when the baffle plate 19 is pushed upward.

Figure 2:
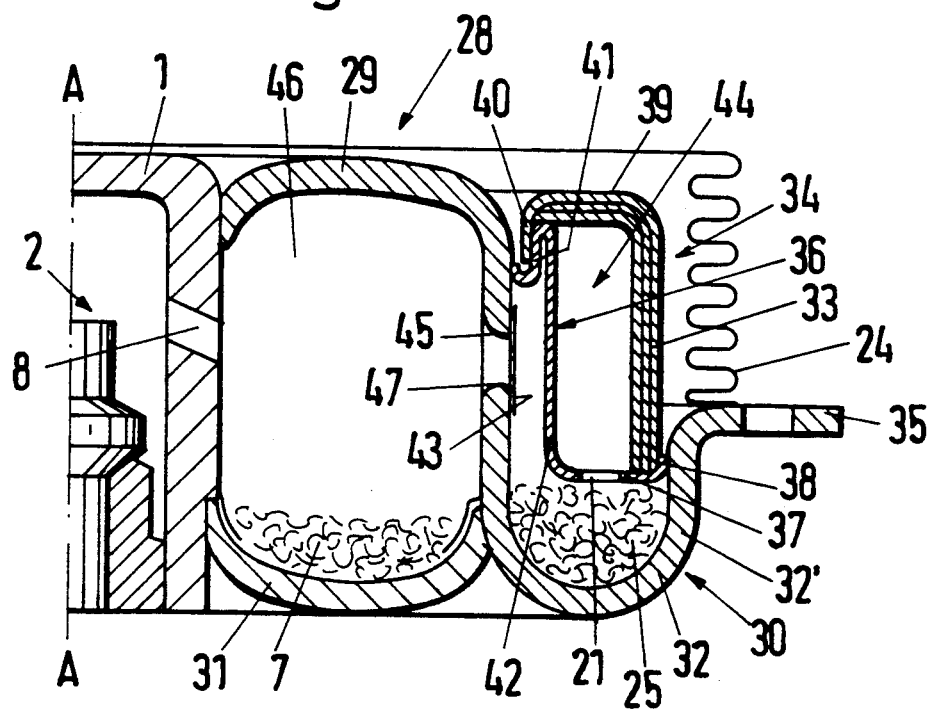
FIG. 2 is a cross sectional view of a second embodiment according to the invention.

In the embodiment according to FIG. 2, the combustion chamber housing 28 is formed by the inner section 29 of an annular housing shell 30 with S-shaped cross section, the inner edge of the housing shell 30 caused to be in a pressure-tight contact with the central pipe 1, e.g., by welding, and by a cover 31, whose inner edge is connected to the central pipe 1 in a pressure-tight manner, e.g., by welding, and whose outer edge is connected to the housing shell 30.

The outer edge 32 of the S-shaped housing edge 30 extending over the combustion chamber housing 28 forms a wall extending radially to the outside from an axial end of the combustion chamber housing 28. The radially outer wall section 32' of this wall, which is curved in the axial direction, extends over the lower circumferential edge of the cylindrical wall section 33 of the filter ring 34. A mounting flange 35 extends radially to the outside from the wall section 32' bent radially inwardly, with which the mounting flange is made in one piece.

In the embodiment according to FIG. 2, the baffle plate 36 has, on the radially extending section 37, an edge 38, which is bent inwardly and extends over the lower circumferential edge of the cylindrical wall section 33 of the filter ring 34. This edge 38 is in contact with the outer section 32 of the housing shell 30. The edge 38 may be rigidly connected to the filter ring 34, e.g., by welding.

Furthermore, the radially inner side of the radially extending wall section 39 is provided with an annular edge 40 bent over in the inward direction, which extends over a strap-shaped section 41 of the cylindrical section 42 of the baffle plate 36 and is rigidly connected thereto, e.g., by welding. The inner edge of the strap-shaped section 41 of the baffle plate 36 is in contact with the combustion chamber housing 28.

In the embodiment according to FIG. 2, the filter ring 34 and the baffle plate 36 consequently form one assembly unit. This unit is fastened on the housing shell 30 in the axial direction by frictional connection and/or in a positive-locking manner.

To achieve this, the edge 38 at the radial section 37 and the edge of the strap-shaped section 41 of the baffle plate 36, which edge faces the combustion chamber housing 28, can be connected to the outer and inner sections 32 and 29, respectively, of the housing shell 30 by a clamping connection. By providing an annular groove or projections, positive locking may also be achieved on the outside of the combustion chamber housing 28 in the area with which the inner edge of the strap-shaped section 41 of the baffle plate 36 is in contact.

In the embodiment according to FIG. 2, the separate cover plate 13 according to FIG. 1 is consequently omitted, because it is made in one piece with the housing shell 30. Even though the outer section 32 in the embodiment according to FIG. 2 has a greater wall thickness than the cover plate 13 according to FIG. 1, this offers the advantage that the risk of burn-through holes is reduced. The greater wall thickness also improves stability. However, if desired, the wall thickness of the outer section 32 of the housing shell 30 may be reduced by stretching.

The gas generator according to FIG. 2 is also provided with only three welded seams, namely, one in the area where the inner edge of the S-shaped housing shell 30 abuts against the central pipe 1, and the two others in the area where the cover 31 is in contact with the central pipe 1 and the housing shell 30, respectively.

In the embodiment according to FIG. 2, the film 43 is also fastened on the side of the passage openings 45 facing the filter chamber 44, i.e., the film 43 can be inserted from the outside without problems. This, which is already a great advantage in itself, is further enhanced by the fact that in this embodiment, the adhesive bonding of the film 43 is practically no longer affected during welding, due to the relatively great distance between the cover 31 and the housing shell 30, unlike in the case of the embodiment according to FIG. 1, so that the risk of leakage as a consequence of thermal action on the adhesive of the film 43 is reduced.

The film 43, arranged on the outside, also has the further substantial advantage that the edges 47 of the passage openings 45 facing the combustion chamber 46 can be optimally rounded.

Such rounded inner edges are not possible if the film 26 is arranged inside according to FIG. 1, because the bonding area around the opening 45 would be too small to guarantee complete tightness.

Figure 3:
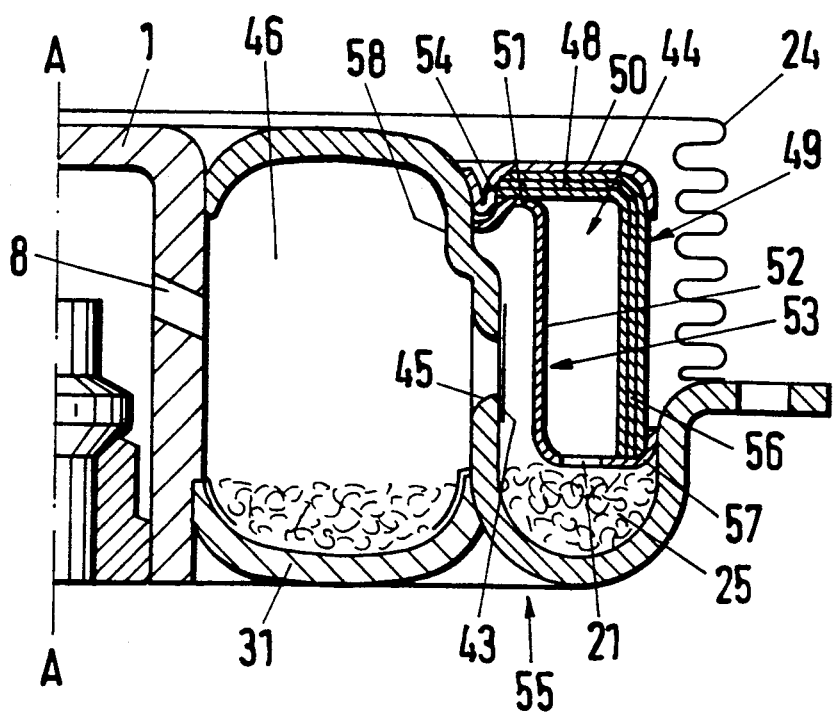
FIG. 3 is a cross sectional view of a third embodiment of the gas generator according to the present invention.

The embodiment according to FIG. 3 differs from that according to FIG. 2 essentially in that an annular cover plate 50 extending over the radially extending section 48 of the filter ring 49 is provided, and the inner, axially extending section of this cover plate 50 is in contact with the inner edge of the strap-shaped section 51 of the cylindrical section 52 of the baffle plate 53. Consequently, in the embodiment according to FIG. 3, the radially extending section 48 of the filter ring 49 need not be welded to the strap-shaped section 51 of the baffle plate 53.

The cover plate 50 is provided with a recessed part 54, which is fastened on the housing shell 55 by clamping and/or positive locking, as was described above in connection with the inner edge of the strap-shaped section 41 of the baffle plate 36 according to FIG. 2.

In the embodiment according to FIG. 3, the cylindrical section 56 of the filter ring 49 may be fastened on the radially extending section 57 of the baffle plate 53, e.g., by welding, corresponding to FIG. 2, and the radial section 57 of the baffle plate 53 may be in contact with the housing shell 55 by clamping connection, if desired.

The housing shell 55 has a tapered area 58 in the area with which the recessed part 54 of the cover plate 50 is in contact.

The cover plate 50 has the advantage that the axial thrust of the gas generator, which occurs in the embodiment according to FIG. 2 due to the discharge of the propellant gases from the radially extending section 39 of the filter ring 34, is eliminated. This axial thrust is the source of the risk of the air bag 24 becoming excessively inflated in the upward direction, as a result of which the inflation characteristics are unfavorably affected.

While specific embodiments of the invention have been shown and described in detail to illustrate the application of the principles of the invention, it will be understood that the invention may be embodied otherwise without departing from such principles.

What is claimed is:

1. A gas generator for an inflatable protective cushion of a collision protection system for occupants of a vehicle, comprising: means defining a combustion chamber filled with a solid propellant that can be ignited by an igniting unit, the combustion chamber including passage openings for passage of expanding gas; and, a filter ring cooperating with said means defining a combustion chamber to provide a filter chamber positioned adjacent the combustion chamber, said filter chamber communicating with the combustion chamber through said passage openings, said filter ring having an exposed annular surface extending continuously on its outside over its circumference for discharging propellant gases into an air bag.

2. A gas generator according to claim 1, wherein said means defining a combustion chamber includes a toroidal housing surrounding a central pipe, said igniting unit being positioned in said central pipe, said toroidal housing having a radially outwardly extending wall, said radially outwardly extending wall cooperating with said filter ring to delimit said filter chamber, said filter ring joining at least one of two axial ends of the combustion chamber.

3. A gas generator according to claim 2, wherein said combustion chamber is formed by an inner section of an annular housing shell with an s-shaped cross section, said annular housing shell having an inner edge connected to said central pipe and including a cover having an inner edge connected to said central pipe, an outer edge of said cover being connected to said annular housing shell, an outer section of said annular housing shell extending beyond the combustion chamber and cooperating with said filter ring to delimit the filter chamber.

4. A gas generator according to claim 2, wherein the combustion chamber includes a wall extending in an outer direction, said wall carrying a mounting flange on its outer circumferential surface.

5. A gas generator according to claim 1, wherein said filter ring has an angular cross section with a vertex facing away from the combustion chamber.

6. A gas generator according to claim 5, wherein the exposed annular surface of the filter ring includes a cylindrical section of the filter ring.

7. A gas generator according to claim 1, further comprising an annular baffle plate with an angular cross section, a vertex of said angular cross section facing said combustion chamber and being located opposite the passage openings including a section facing away from the passage openings including a baffle plate passage opening for passage of propellent gas through the annular baffle plate.

8. A gas generator according to claim 7, wherein a pre-filter is arranged in said filter chamber in front of the baffle plate passage opening.

9. A gas generator according to claim 7, wherein said filter ring and said baffle plate are connected to form one unit.

10. A gas generator according to claim 2, wherein said radially outwardly extending wall is formed by an annular cover plate axially covering a portion of said filter ring.

11. A gas generator according to claim 9, wherein said baffle plate and/or a cover plate, covering a portion of said filter ring, is fastened at an inner edge to said combustion chamber by a frictional connection and/or a positive-locking connection.

12. A gas generator according to claim 11, wherein said passage openings are closed on an outside by a sealing film.

13. A gas generator according to claim 12, wherein said passage openings are rounded on an inside thereof.

14. A gas generator according to claim 1, wherein said combustion chamber is formed as an annular combustion chamber.

15. A gas generator for an inflatable protective cushion of a collision protection system for occupants of a vehicle, the gas generator comprising:
means defining a combustion chamber filled with a solid propellant that can be ignited by an ignition unit, the combustion chamber including passage openings for passage of expanding gas and including a housing plate with a radially extending external section, adjacent said passage opening, said external section providing a portion of a filter support; a filter ring cooperating with said means defining a combustion chamber to provide a filter chamber positioned adjacent said combustion chamber, said filter chamber communicating with said combustion chamber through said passage openings, said filter ring having an exposed annular surface extending continuously on an outside of said filter ring, over its circumference, for discharging propellent gases into an air bag; and, filter support means cooperating with said external section to positionally fix said filter ring connected to said means defining a combustion chamber, said support means being positioned in said filter chamber.

16. A gas generator for an inflatable protective cushion of a collision protection system for occupants of a vehicle, the gas generator comprising: housing elements cooperating to define a combustion chamber filled with a solid propellent, said propellent being ignited by an ignition unit, one of said housing elements including passage openings for passage of expanding gas, one of said housing elements including a radially extending external section extending radially outwardly of said combustion chamber and extending annularly about said combustion chamber; an annular filter ring cooperating with said radially extending external section and said housing elements to provide a filter chamber positioned adjacent said combustion chamber, said filter chamber communicating with said combustion chamber through said passage openings; and filter ring retaining means positioned in said filter chamber for retaining said filter ring relative to said housing elements and said radially extending external section for supporting said filter ring to provide said filter ring with an exposed annular surface extending continuously on an outside of said filter ring over a circumference of said filter ring for discharging propellent gases into an air bag.

* * * * *